(12) United States Patent
Xue et al.

(10) Patent No.: US 12,127,043 B2
(45) Date of Patent: Oct. 22, 2024

(54) WIRELESS BANDWIDTH ADJUSTMENT METHOD AND APPARATUS, TERMINAL AND STORAGE MEDIUM

(71) Applicants: GREE ELECTRIC APPLIANCES, INC. OF ZHUHAI, Zhuhai (CN); LEAYUN TECHNOLOGY CO., LTD. OF ZHUHAI, Zhuhai (CN)

(72) Inventors: Fan Xue, Zhuhai (CN); Jie Tang, Zhuhai (CN); Hongwei Xu, Zhuhai (CN); Shu Yang, Zhuhai (CN)

(73) Assignees: GREE ELECTRIC APPLIANCES, INC. OF ZHUHAI, Zhuhai (CN); LEAYUN TECHNOLOGY CO., LTD. OF ZHUHAI, Zhuhai (CN)

( * ) Notice: Subject to any disclaimer, the term of this patent is extended or adjusted under 35 U.S.C. 154(b) by 343 days.

(21) Appl. No.: 17/720,593

(22) Filed: Apr. 14, 2022

(65) Prior Publication Data

US 2022/0240125 A1 Jul. 28, 2022

Related U.S. Application Data

(63) Continuation of application No. PCT/CN2019/127512, filed on Dec. 23, 2019.

(30) Foreign Application Priority Data

Oct. 21, 2019 (CN) .......................... 201911002689.0

(51) Int. Cl.
*H04W 28/20* (2009.01)
*H04W 24/08* (2009.01)
(Continued)

(52) U.S. Cl.
CPC ........... *H04W 28/20* (2013.01); *H04W 24/08* (2013.01); *H04W 72/52* (2023.01); *H04W 72/535* (2023.01)

(58) Field of Classification Search
CPC ..... H04W 28/20; H04W 24/08; H04W 72/52; H04W 72/535; H04W 4/70; H04W 72/53; H04W 72/0453
See application file for complete search history.

(56) References Cited

U.S. PATENT DOCUMENTS

2015/0095478 A1 4/2015 Zuerner
2017/0126578 A1 5/2017 Amulothu et al.
(Continued)

FOREIGN PATENT DOCUMENTS

CN 107623643 A * 1/2018
CN 108848536 A * 11/2018 ........... H04B 17/318
(Continued)

OTHER PUBLICATIONS

Extended European Search Report issued in counterpart European Patent Application No. 19949803.1, dated Nov. 3, 2022.
(Continued)

*Primary Examiner* — Chae S Lee
(74) *Attorney, Agent, or Firm* — Westbridge IP LLC (57) ABSTRACT

Disclosed are a wireless bandwidth adjustment method, a wireless bandwidth adjustment apparatus, a terminal, and a storage medium. The wireless bandwidth adjustment method includes: determining a target IOT device and a bandwidth currently used by the target IOT device; collecting statistics on communication data of the target IOT device generated within a preset time period; determining a wireless bandwidth adjustment strategy based on the communication data; and adjusting the bandwidth based on the wireless bandwidth adjustment strategy.

14 Claims, 5 Drawing Sheets

(51) Int. Cl.
*H04W 72/50* (2023.01)
*H04W 72/52* (2023.01)

(56) References Cited

U.S. PATENT DOCUMENTS

2018/0287751 A1   10/2018  Lim et al.
2021/0007014 A1*  1/2021   Desai ................... H04W 4/70

FOREIGN PATENT DOCUMENTS

CN     109962856 A  *  7/2019  ............ H04L 47/25
CN     109962856 B     7/2022
EP       3319322 A1     5/2018

OTHER PUBLICATIONS

First Office Action issued in counterpart Chinese Patent Application No. 201911002689.0, dated Sep. 28, 2021.
International Search Report issued in corresponding PCT Application No. PCT/CN2019/127512, dated Jun. 2, 2020.
Written Opinion issued in corresponding PCT Application No. PCT/CN2019/127512, dated Jun. 2, 2020.

* cited by examiner

WIRELESS BANDWIDTH ADJUSTMENT METHOD AND APPARATUS, TERMINAL AND STORAGE MEDIUM

CROSS-REFERENCE TO RELATED APPLICATIONS

This disclosure is a continuation of International Application No. PCT/CN2019/127512, filed on Dec. 23, 2019, which claims priority to Chinese Patent Application No. 201911002689.0, filed on Oct. 21, 2019. Both applications are incorporated herein by reference in their entireties.

TECHNICAL FIELD

The present disclosure relates to the field of wireless local area network communication technologies, and in particular, to a wireless bandwidth adjustment method, a wireless bandwidth adjustment apparatus, a terminal, and a storage medium.

BACKGROUND

The rapid development of the Internet has brought great changes to the work and life of users. In recent years, Wireless Local Area Network (WLAN) based on an IEEE 802.11 standard has been developed rapidly. In order to meet ever-increasing demands for high speed data flow, the Institute of Electrical and Electronics Engineers (IEEE) formulated a newest wireless network standard 802.11ax. An IEEE 802.11ax communication protocol aims to support both indoor and outdoor scenarios, improve bandwidth efficiency, and achieve a fourfold increase in actual throughput in a user dense environment.

With the formulation of the IEEE 802.11ax communication protocol, a communication technology based on Orthogonal Frequency Division Multiple Access (OFDMA) is going to be gradually developed in application of the Internet of Things (TOT) in the wireless local area network. The communication technology based on OFDMA greatly increases a current communication rate based on the conventional 802.11 communication protocol.

SUMMARY

According to an aspect of the present disclosure, a wireless bandwidth adjustment method is provided, including:
determining a target IOT device and a bandwidth currently used by the target IOT device;
collecting statistics on communication data of the target IOT device generated within a preset time period;
determining a wireless bandwidth adjustment strategy based on the communication data; and
adjusting the bandwidth based on the wireless bandwidth adjustment strategy.

In some embodiments, the determining a wireless bandwidth adjustment strategy based on the communication data includes:
determining a first transmission time corresponding to the communication data, where the first transmission time includes a time consumed by the target IOT device to transmit the communication data to an AP;
obtaining a second transmission time, in the target Internet of Things device, for the target IOT device to transmit a preset amount of communication data;
comparing the first transmission time with the second transmission time; and
determining the wireless bandwidth adjustment strategy based on a comparison result.

In some embodiments, the determining the wireless bandwidth adjustment strategy based on a comparison result includes:
if the first transmission time is greater than the second transmission time, determining that the wireless bandwidth adjustment strategy is a wireless bandwidth extending strategy,
where the adjusting the bandwidth based on the wireless bandwidth adjustment strategy includes:
extending the bandwidth based on the wireless bandwidth extending strategy.

In some embodiments, the determining the wireless bandwidth adjustment strategy based on a comparison result includes:
if the first transmission time is less than the second transmission time, determining that the wireless bandwidth adjustment strategy is a wireless bandwidth narrowing strategy,
where the adjusting the bandwidth based on the wireless bandwidth adjustment strategy includes:
narrowing the bandwidth based on the wireless bandwidth narrowing strategy.

In some embodiments, the bandwidth includes:
a bandwidth included by a sub-channel, defined in an IEEE 802.11ax communication protocol, allocated by an AP for the target IOT device.

In some embodiments, the determining a target IOT device includes:
determining an IOT device currently accessing an AP; and
determining the IOT device as the target IOT device.

According to an aspect of the present disclosure, a wireless bandwidth adjustment apparatus is provided, including:
a device-and-bandwidth determining module, configured to determine a target IOT device and a bandwidth currently used by the target IOT device;
a data statistics module, configured to collect statistics on communication data of the target IOT device generated within a preset time period;
a strategy determining module, configured to determine a wireless bandwidth adjustment strategy based on the communication data; and
a bandwidth adjusting module, configured to adjust the bandwidth based on the wireless bandwidth adjustment strategy.

In some embodiments, the strategy determining module is specifically configured to:
determine a first transmission time corresponding to the communication data, where the first transmission time includes a time consumed by the target IOT device to transmit the communication data to an AP;
obtain a second transmission time, in the target Internet of Things device, for the target IOT device to transmit a preset amount of communication data;
compare the first transmission time with the second transmission time; and
determine the wireless bandwidth adjustment strategy based on a comparison result.

According to an aspect of the present disclosure, a terminal is provided, including: a processor, a communication interface, a memory, and a communication bus. The processor, the communication interface, and the memory complete communication with each other by using the communication bus. The memory is configured to store a computer program, and the processor is configured to execute the program stored in the memory, to implement the foregoing wireless bandwidth adjustment method.

According to an aspect of the present disclosure, a storage medium storing a computer program is provided. When the program is executed by a processor, the foregoing wireless bandwidth adjustment method is implemented.

BRIEF DESCRIPTION OF DRAWINGS

Accompanying drawings herein included in this specification and constituting a part of this specification illustrate embodiments in accordance with the present disclosure, and are used for explaining principles of the present disclosure together with this specification.

To describe the technical solutions in the embodiments of the present disclosure or the prior art more clearly, the following briefly describes the accompanying drawings required for describing the embodiments or the prior art. Apparently, a person of ordinary skill in the art may still derive other drawings from these accompanying drawings without creative efforts.

DETAILED DESCRIPTION OF THE EMBODIMENTS

For clearer description of the objectives, technical solutions and advantages of embodiments of the present disclosure, the technical solutions in the embodiments of the present disclosure are clearly described below with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Research has found that when communication is performed between a wireless access point (AP) and an IOT device based on a communication technology based on OFDMA, a bandwidth used by the IOT device needs to be dynamically adjusted.

In view of this, the present disclosure provides a wireless bandwidth adjustment method and apparatus, a terminal, and a storage medium, which can improve stability of connection between an IOT device and AP.

In the embodiments of the present disclosure, for a target IOT device, statistics on communication data of the target IOT device generated within a preset time period are collected, a wireless bandwidth adjustment strategy is determined based on the communication data of the target IOT device generated within the preset time period, and a bandwidth currently used by the target IOT device is further adjusted based on the wireless bandwidth adjustment strategy, to implement dynamic adjustment of a wireless bandwidth, improve stability of connection between an IOT device and an AP, and guarantee user experience.

Figure 1:
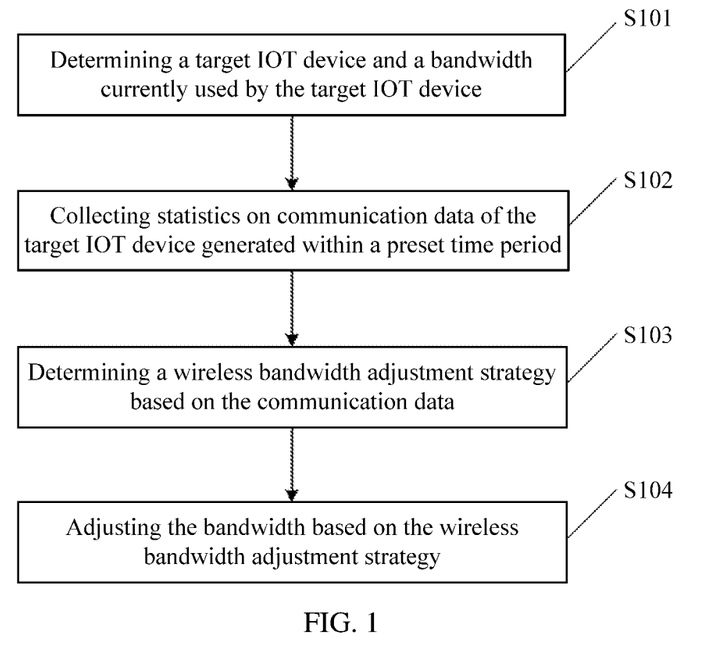
FIG. 1 is a schematic flowchart of some embodiments of a wireless bandwidth adjustment method according to the present disclosure.

The following further describes the technical solutions provided in the embodiments of the present disclosure with reference to the accompanying drawings. FIG. 1 is a schematic flowchart of some embodiments of a wireless bandwidth adjustment method according to the present disclosure. Referring to FIG. 1, in some embodiments, the method may be applied to an AP, and specifically includes the following steps S101 to S104.

Step S101: determining a target IOT device and a bandwidth currently used by the target IOT device.

In the embodiments of the present disclosure, to adjust a bandwidth currently used by an IOT device, it is necessary to determine adjustment objects, namely the target IOT device, and the bandwidth currently used by the target IOT device, so that the bandwidth currently used by the target IOT device is subsequently adjusted.

In the embodiments of the present disclosure, the target IOT device is any IOT device that has accessed the AP.

For a target IOT device, in the embodiments of the present disclosure, the target IOT device is determined based on a specific strategy, for example, a randomized strategy, a polling strategy, or a user-defined strategy, and the embodiments of the present disclosure are not limited thereto.

For the foregoing determined target IOT device, in some embodiments, a wireless bandwidth entry that matches the target IOT device is searched locally on the AP. A bandwidth currently used by the target IOT device is recorded in the wireless bandwidth entry, and then the bandwidth currently used by the target IOT device is determined based on the wireless bandwidth entry.

Figure 2:
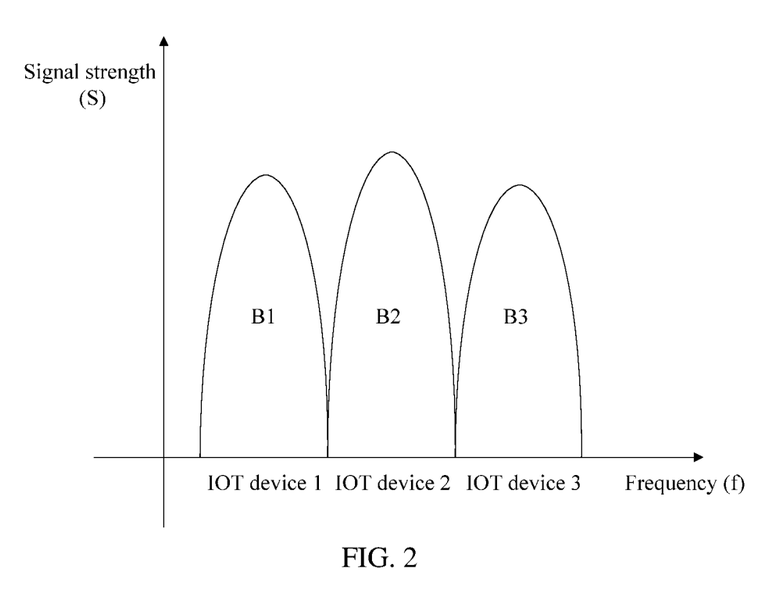
FIG. 2 is a schematic diagram of a bandwidth currently used by an IOT device related to some embodiments of a wireless bandwidth adjustment method according to the present disclosure.

For example, IOT devices that have accessed the AP include an IOT device 1, an IOT device 2, an IOT device 3, and the like. The target IOT device (IOT device 1) is determined based on a randomized strategy. The AP locally stores a wireless bandwidth entry 1 that matches the IOT device 1, a wireless bandwidth entry 2 that matches the IOT device 2, and a wireless bandwidth entry 3 that matches the IOT device 3. A bandwidth B1 currently used by the IOT device 1 is recorded in the wireless bandwidth entry 1, a bandwidth B2 currently used by the IOT device 2 is recorded in the wireless bandwidth entry 2, and a bandwidth B3 currently used by the IOT device 3 is recorded in the wireless bandwidth entry 3. As shown in FIG. 2, the bandwidth B1 currently used by the target IOT device (IOT device 1) is determined.

Step S102: collecting statistics on communication data of the target IOT device generated within a preset time period.

In the embodiments of the present disclosure, for the target IOT device determined in the foregoing step, statistics on the communication data of the target IOT device generated within the preset time period are collected. In the embodiments of the present disclosure, the communication data of the target IOT device generated within the preset time period is communication data generated between the target IOT device and the AP within the preset time period.

For example, for the target IOT device (IOT device 1), statistics on communication data of 1 MB (or 1 GB) generated between the target IOT device (IOT device 1) and the AP within the last 1 minute (or the last 1 hour) are collected.

Step S103: determining a wireless bandwidth adjustment strategy based on the communication data.

In the embodiments of the present disclosure, the wireless bandwidth adjustment strategy is determined based on the statistics on the communication data that are collected in the foregoing step.

For example, after the statistics on communication data of 1 MB (or 1 GB) generated between the target IOT device (IOT device 1) and the AP within the last 1 minute (or the last 1 hour) are collected, a wireless bandwidth adjustment strategy 1 is determined based on the communication data of 1 MB (or 1 GB).

Step S104: adjusting the bandwidth based on the wireless bandwidth adjustment strategy.

In the embodiments of the present disclosure, the bandwidth currently used by the target IOT device is adjusted based on the wireless bandwidth adjustment strategy determined in the foregoing step.

For example, the bandwidth currently used by the target IOT device (IOT device 1) is B1, and the bandwidth B1 currently used by the target IOT device (IOT device 1) is adjusted based on the wireless bandwidth adjustment strategy 1 determined based on the foregoing communication data of 1 MB (or 1 GB).

Through the description of the technical solutions provided in the embodiments of the present disclosure, for a target IOT device, statistics on communication data generated within a preset time period are collected, a wireless bandwidth adjustment strategy is determined based on the communication data, and a bandwidth currently used by the target IOT device is adjusted based on the wireless bandwidth adjustment strategy, thereby implementing dynamic adjustment of a wireless bandwidth, further improving stability of connection between an IOT device and an AP, and guaranteeing user experience.

Figure 3:
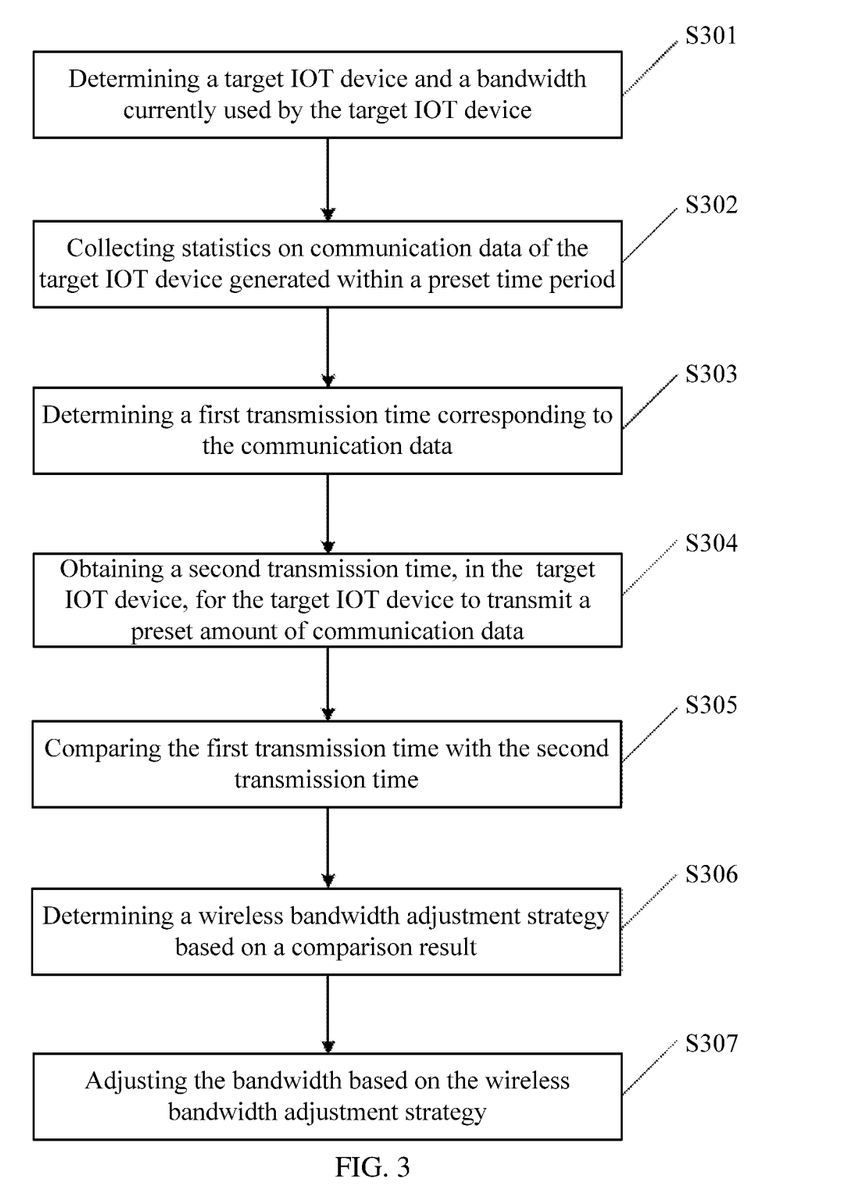
FIG. 3 is a schematic flowchart of some other embodiments of a wireless bandwidth adjustment method according to the present disclosure.

FIG. 3 is a schematic flowchart of some other embodiments of a wireless bandwidth adjustment method according to the present disclosure. The method specifically includes the following steps S301 to S307.

Step S301: determining a target IOT device and a bandwidth currently used by the target IOT device.

In the embodiments of the present disclosure, to adjust a bandwidth currently used by an IOT device, it is necessary to determine adjustment objects, namely the target IOT device, and the bandwidth currently used by the target IOT device, so that the bandwidth currently used by the target IOT device is subsequently adjusted.

In the embodiments of the present disclosure, the target IOT device is an IOT device currently accessing an AP, that is, the IOT device currently accessing the AP is determined as the target IOT device.

In the embodiments of the present disclosure, because the target IOT device is the IOT device currently accessing an AP, a bandwidth currently used by the IOT device is an initial bandwidth (or a default bandwidth) allocated by the AP for the IOT device. The IOT device uses the initial bandwidth (or the default bandwidth) to communicate with the AP.

Figure 4:
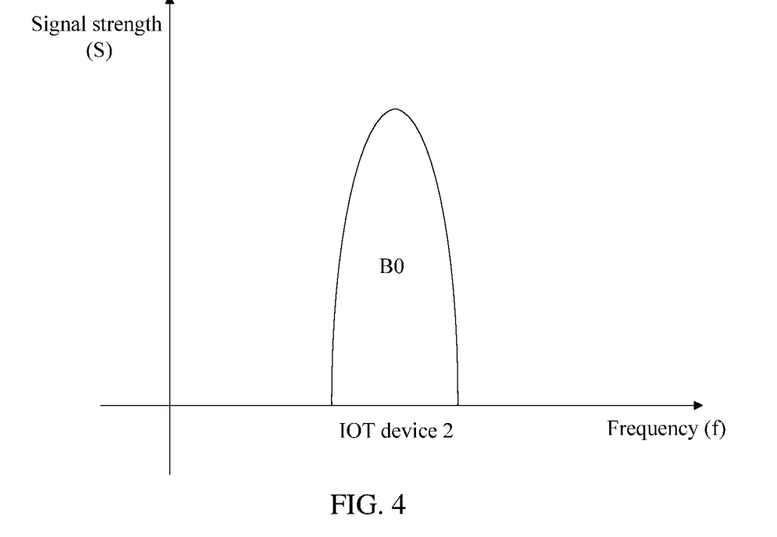
FIG. 4 is a schematic diagram of a bandwidth currently used by a target IOT device related to some other embodiments of a wireless bandwidth adjustment method according to the present disclosure.

For example, for an IOT device 2 currently accessing the AP, the IOT device 2 is determined as the target IOT device. Since an initial bandwidth allocated by the AP for the IOT device 2 is B0, the bandwidth currently used by the target IOT device (IOT device 2) is further determined as B0, as shown in FIG. 4.

In some embodiments of the present disclosure, the bandwidth currently used by the target IOT device is a bandwidth included by a sub-channel, defined in an IEEE 802.11ax communication protocol, allocated by the AP for the target IOT device. In some other embodiments, the bandwidth currently used by the target IOT device is a bandwidth included by a sub-channel, defined in an IEEE 802.11a communication protocol, an IEEE 802.11g communication protocol, or the like, allocated by the AP for the target IOT device.

For example, the bandwidth currently used by the target IOT device (IOT device 2) is a bandwidth B2 included by a sub-channel 1, defined in an IEEE 802.11ax communication protocol, allocated by the AP for the target IOT device, as shown in FIG. 2.

Step S302: collecting statistics on communication data of the target IOT device generated within a preset time period.

In the embodiments of the present disclosure, this step is similar to Step S102 in the embodiments illustrated in FIG. 1, and details are not described herein again.

Step S303: determining a first transmission time corresponding to the communication data, where the first transmission time includes a time consumed by the target IOT device to transmit the communication data to an AP.

In some embodiments, the communication data of the target IOT device generated within the preset time period is communication data generated between the target IOT device and the AP within the preset time period, and the first transmission time corresponding to the communication data is a time consumed by the target IOT device to transmit the communication data generated within the preset time period to the AP.

For example, for the target IOT device (IOT device 2), statistics on communication data (1 MB) generated between the target IOT device (IOT device 2) and the AP within the last 1 minute are collected, and a time consumed by the target IOT device (IOT device 2) to transmit the communication data (1 MB) to the AP is T0. It can be determined that the first transmission time corresponding to the communication data is T0.

Step S304: obtaining a second transmission time, in the target Internet of Things device, for the target IOT device to transmit a preset amount of communication data.

In some embodiments, the second transmission time for transmitting a preset amount of communication data is locally stored on the target IOT device, and the second transmission time is used to indicate a time limit for the target IOT device to transmit a preset amount of communication data to the AP.

For example, the second transmission time is recorded as T, which denotes a time limit for the target IOT device to transmit communication data of 1 MB to the AP. In an ideal case, to guarantee a utilization rate of a wireless bandwidth, a time for the target IOT device to transmit communication data of 1 MB to the AP is set to T. However, in an actual case, the time for the target IOT device to transmit communication data of 1 MB to the AP is greater than or less than T, which does not match the second transmission time.

In the embodiments of the present disclosure, to implement dynamic adjustment of a wireless bandwidth, the second transmission time for the target IOT device to transmit a preset amount of communication data needs to be obtained from the target IOT device.

Step S305: comparing the first transmission time with the second transmission time.

For the first transmission time, corresponding to the communication data, determined in the foregoing step, and the obtained second transmission time, the first transmission time is compared with the second transmission time in some embodiments of the present disclosure.

For example, for the first transmission time T0, corresponding to the communication data, determined in the foregoing step, and the obtained second transmission time T, the first transmission time T0 is compared with the second transmission time T in the embodiments of the present disclosure.

Step S306: determining a wireless bandwidth adjustment strategy based on a comparison result.

In some embodiments, the wireless bandwidth adjustment strategy is determined based on a comparison result between the first transmission time and the second transmission time.

If the first transmission time is greater than the second transmission time, it is determined that the wireless bandwidth adjustment strategy is a wireless bandwidth extending strategy.

For example, if the first transmission time T0 is greater than the second transmission time T, it is determined that the wireless bandwidth adjustment strategy is a wireless bandwidth extending strategy P1. The wireless bandwidth extending strategy P1 is as follows:

$$B=B0+F(T0\&B0).$$

B0 denotes a bandwidth currently used by a target IOT device, and $F(T0\&B0)$ denotes a function that meets a specific mathematical relation. For example, $F(T0\&B0)$ is $((T0-T)/T)*B0$.

In some other embodiments, the wireless bandwidth extending strategy is in another form, and the present disclosure is not limited thereto.

In addition, if the first transmission time is less than the second transmission time, it is determined that the wireless bandwidth adjustment strategy is a wireless bandwidth narrowing strategy.

For example, if the first transmission time T0 is less than the second transmission time T, it is determined that the wireless bandwidth adjustment strategy is a wireless bandwidth narrowing strategy P2. The wireless bandwidth narrowing strategy P2 is as follows:

$$B=B0-F(T0\&B0).$$

B0 denotes a bandwidth currently used by a target IOT device, and $F(T0\&B0)$ denotes a function that meets a specific mathematical relation. For example, $F(T0\&B0)$ is $((T-T0)/T)*B0$.

In some other embodiments, the wireless bandwidth narrowing strategy is in another form, and the present disclosure is not limited thereto.

If the first transmission time is equal to the second transmission time, the bandwidth currently used by the target IOT device does not need to be adjusted, and it may be determined that the bandwidth currently used by the target IOT device is a bandwidth suitable for the target IOT device.

Step S307: adjusting the bandwidth based on the wireless bandwidth adjustment strategy.

In the embodiments of the present disclosure, for the wireless bandwidth adjustment strategy determined in the foregoing step, the bandwidth currently used by the target IOT device may be adjusted based on the wireless bandwidth adjustment strategy.

Specifically, if the wireless bandwidth adjustment strategy is the wireless bandwidth extending strategy, the bandwidth currently used by the target IOT device is widened based on the wireless bandwidth extending strategy, and the target IOT device subsequently uses a widened bandwidth to communication.

Figure 5:
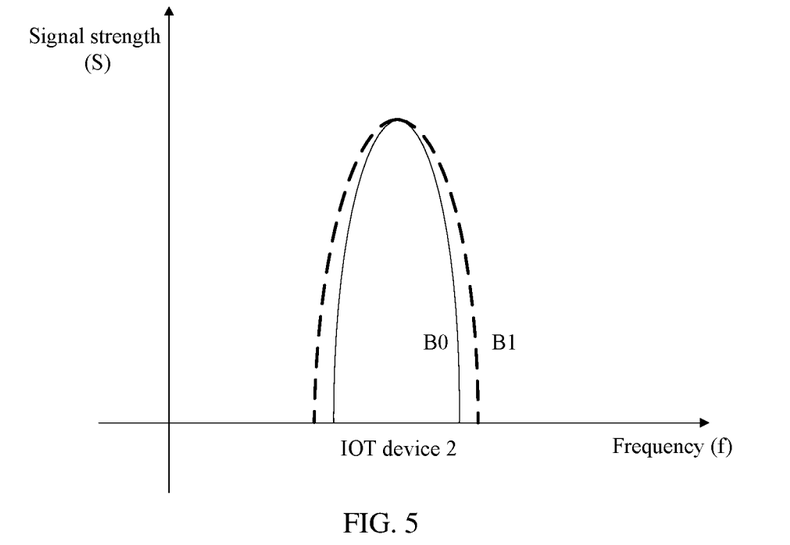
FIG. 5 is a schematic diagram of extending a bandwidth currently used by a target IOT device related to some other embodiments of a wireless bandwidth adjustment method according to the present disclosure.

For example, the bandwidth currently used by the target IOT device (IOT device 2) is B0, and the wireless bandwidth adjustment strategy is the wireless bandwidth extending strategy. The bandwidth B0 currently used by the target IOT device (IOT device 2) is widened based on the wireless bandwidth extending strategy, and the widened bandwidth used by the target IOT device (IOT device 2) is B1, as shown in FIG. 5.

If the wireless bandwidth adjustment strategy is the wireless bandwidth narrowing strategy, the bandwidth currently used by the target IOT device is narrowed based on the wireless bandwidth narrowing strategy, and the target IOT device subsequently uses a narrowed bandwidth to communication.

Figure 6:
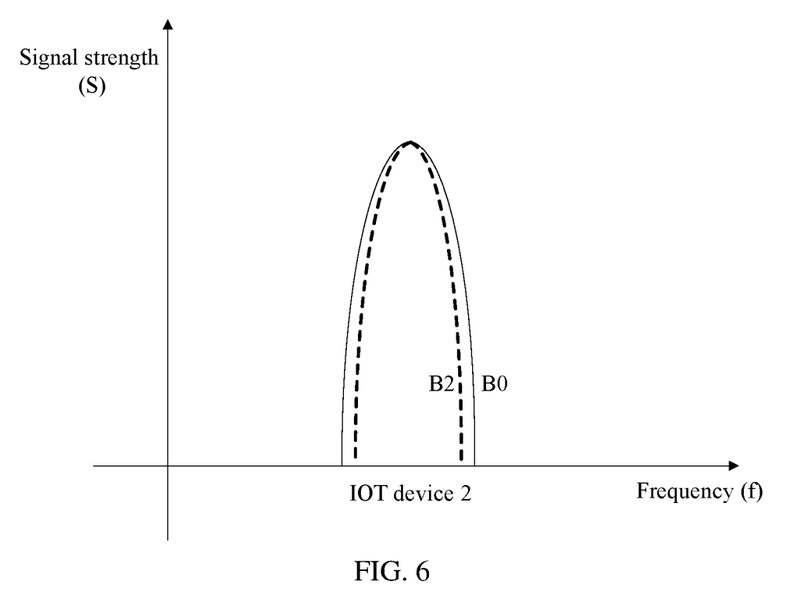
FIG. 6 is a schematic diagram of narrowing a bandwidth currently used by a target IOT device related to some other embodiments of a wireless bandwidth adjustment method according to the present disclosure.

For example, the bandwidth currently used by the target IOT device (IOT device 2) is B0, and the wireless bandwidth adjustment strategy is the wireless bandwidth narrowing strategy. The bandwidth B0 currently used by the target IOT device (IOT device 2) is narrowed based on the wireless bandwidth narrowing strategy, and the narrowed bandwidth used by the target IOT device (IOT device 2) is B2, as shown in FIG. 6.

Figure 7:
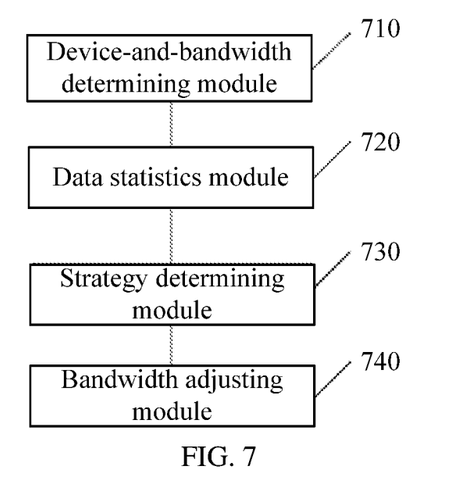
FIG. 7 is a schematic structural diagram of some embodiments of a wireless bandwidth adjustment apparatus according to the present disclosure.

In correspondence to the foregoing method embodiments, an embodiment of the present disclosure further provides a wireless bandwidth adjustment apparatus. As shown in FIG. 7, the apparatus includes a device-and-bandwidth determining module 710, a data statistics module 720, a strategy determining module 730, and a bandwidth adjusting module 740.

The device-and-bandwidth determining module 710 is configured to determine a target IOT device and a bandwidth currently used by the target IOT device. The data statistics module 720 is configured to collect statistics on communication data of the target IOT device generated within a preset time period. The strategy determining module 730 is configured to determine a wireless bandwidth adjustment strategy based on the communication data. The bandwidth adjusting module 740 is configured to adjust the bandwidth based on the wireless bandwidth adjustment strategy.

In some embodiments of the present disclosure, the strategy determining module 730 is specifically configured to: determine a first transmission time corresponding to the communication data, where the first transmission time includes a time consumed by the target IOT device to transmit the communication data to an AP; obtain a second transmission time, in the target IOT device, for the target IOT device to transmit preset a amount of communication data; compare the first transmission time with the second transmission time; and determine the wireless bandwidth adjustment strategy based on a comparison result.

Figure 8:
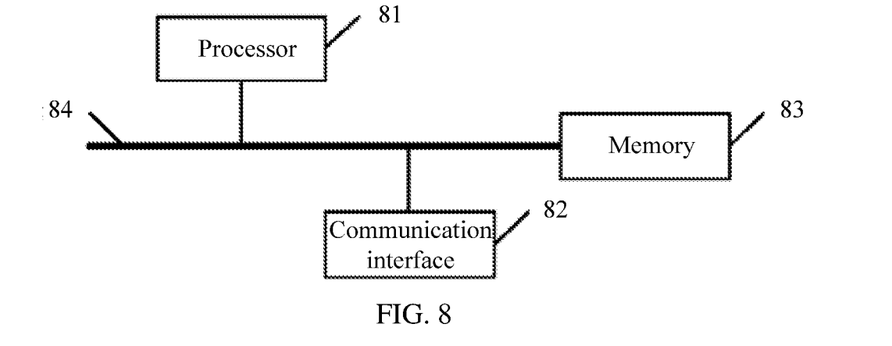
FIG. 8 is a schematic structural diagram of some embodiments of a terminal according to the present disclosure.

An embodiment of the present disclosure further provides a terminal. As shown in FIG. 8, the terminal includes a processor 81, a communication interface 82, a memory 83, and a communication bus 84. The processor 81, the communication interface 82, and the memory 83 complete communication with each other by using the communication bus 84. The memory 83 is configured to store a computer program. The processor 81 is configured to execute the computer program stored in the memory 83, to implement any one of the foregoing wireless bandwidth adjustment methods, for example, implement the following steps: determining a target IOT device and a bandwidth currently used by the target IOT device; collecting statistics on communication data of the target IOT device generated within a preset time period; determining a wireless bandwidth adjustment strategy based on the communication data; and adjusting the bandwidth based on the wireless bandwidth adjustment strategy.

In some embodiments, the communication bus is a Peripheral Component Interconnect (PCI) bus, an Extended Industry Standard Architecture (EISA) bus, or the like. The communication bus includes an address bus, a data bus, a control bus, and the like. For ease of representation, only one bold line is used to represent the bus in this figure, but this does not mean that there is only one bus or one type of bus.

The communication interface is used for communication between the foregoing terminal and another device.

In some embodiments, the memory includes a Random Access Memory (RAM). In some embodiments, the memory includes a non-volatile memory, for example, at least one magnetic disk storage. In some other embodiments, the memory is at least one storage apparatus located away from the processor.

In some embodiments, the processor is a general-purpose processor, including a Central Processing Unit (CPU), a Network Processor (NP), and the like. In some embodiments, the processor may be a Digital Signal Processor (DSP), an Application-Specific Integrated Circuit (ASIC), a Field-Programmable Gate Array (FPGA) or another programmable logic component, a discrete gate or a transistor logic component, or a discrete hardware component.

An embodiment of the present disclosure further provides a storage medium storing a computer program. When the computer program is executed by a processor, any one of the foregoing wireless bandwidth adjustment method embodiments is implemented.

All or some of the foregoing embodiments may be implemented by means of software, hardware, firmware, or any combination thereof. When being implemented by using software, all or some of the embodiments may be implemented in a form of a computer program product. The computer program product includes one or more computer instructions. When the computer program instructions are loaded and executed on the computer, the procedures or functions described in the embodiments of the present disclosure are generated in whole or in part. The computer may be a general-purpose computer, a special-purpose computer, a computer network, or another programmable apparatus. The computer instructions may be stored in a storage medium or transmitted from one storage medium to another storage medium. For example, the computer instructions may be transmitted from a website, a computer, a server, or a data center to another website, computer, server or data center via a wired (such as a coaxial cable, an optical fiber and a Digital Subscriber Line (DSL)) manner or a wireless (such as infrared, wireless and microwave) manner. The storage medium may be any usable medium that can be accessed by a computer or a data storage device such as a server or data center integrated with one or more available mediums. The usable medium may be a magnetic medium (for example, a floppy disk, a hard disk, or a magnetic tape), an optical medium (for example, a DVD), a semiconductor medium (for example, a Solid State Disk (SSD)), or the like.

It should further be noted that in this specification, relational terms such as "first" and "second" are only used to distinguish one entity or operation from another, and do not necessarily require or imply that any actual relationship or sequence exists between these entities or operations. In addition, the terms "comprise", "include" and any other variants thereof are intended to cover non-exclusive inclusion, so that a process, a method, an article, or a device that includes a series of elements not only includes these very elements, but may also include other elements not expressly listed, or also include elements inherent to this process, method, article, or device. Without being subject to further limitations, an element defined by a phrase "including one . . . " does not exclude presence of other identical elements in the process, method, article, or terminal device that includes the element.

The foregoing descriptions are only specific implementations of the present disclosure, so that a person skilled in the art can understand or implement the present disclosure. Various modifications of these embodiments are apparent to a person skilled in the art, and general principles defined in this specification may be implemented in other embodiments without departing from the spirit or scope of the present disclosure. Therefore, the present disclosure is not be limited to the embodiments described in this specification, but extends to the widest scope that complies with the principles and novelty disclosed in this specification.

What is claimed is:

1. A wireless bandwidth adjustment method, comprising:
   determining a target Internet of Things device and a bandwidth currently used by the target Internet of Things device;
   collecting statistics on communication data of the target Internet of Things device generated within a preset time period;
   determining a wireless bandwidth adjustment strategy based on the statistics on the communication data; and
   adjusting the bandwidth based on the wireless bandwidth adjustment strategy;
   wherein the determining a wireless bandwidth adjustment strategy based on the statistics on the communication data comprises:
   determining a first transmission time corresponding to the communication data, wherein the first transmission time comprises a time consumed by the target Internet of Things device to transmit the communication data to a wireless access point;
   obtaining a second transmission time, in the target Internet of Things device, for the target Internet of Things device to transmit a preset amount of communication data, the second transmission time being used to indicate a time limit for the target Internet of Things device to transmit the preset amount of communication data to the wireless access point;
   comparing the first transmission time with the second transmission time; and
   determining the wireless bandwidth adjustment strategy based on a comparison result;
   wherein the determining the wireless bandwidth adjustment strategy based on a comparison result comprises:
   if the first transmission time is greater than the second transmission time, determining that the wireless bandwidth adjustment strategy is a wireless bandwidth extending strategy,
   wherein the adjusting the bandwidth based on the wireless bandwidth adjustment strategy comprises:

extending the bandwidth based on the wireless bandwidth extending strategy;
wherein the determining the wireless bandwidth adjustment strategy based on a comparison result comprises:
if the first transmission time is less than the second transmission time, determining that the wireless bandwidth adjustment strategy is a wireless bandwidth narrowing strategy,
wherein the adjusting the bandwidth based on the wireless bandwidth adjustment strategy comprises:
narrowing the bandwidth based on the wireless bandwidth narrowing strategy.

2. The method according to claim 1, wherein the wireless bandwidth extending strategy is as follows:

$$B=B0+F(T0\&B0);$$

$$F(T0\&B0)=((T0-T)/T)*B0,$$

wherein B0 denotes the bandwidth currently used by the target Internet of Things device; T0 denotes the first transmission time; T denotes the second transmission time.

3. The method according to claim 1, wherein the wireless bandwidth narrowing strategy is as follows:

$$B=B0-F(T0\&B0);$$

$$F(T0\&B0)=((T-T0)/T)*B0,$$

wherein B0 denotes the bandwidth currently used by the target Internet of Things device; T0 denotes the first transmission time; T denotes the second transmission time.

4. The method according to claim 1, wherein the bandwidth comprises:
a bandwidth included by a sub-channel, defined in an Institute of Electrical and Electronics Engineers (IEEE) 802.11ax communication protocol, allocated by a wireless access point for the target Internet of Things device.

5. The method according to claim 1, wherein the bandwidth comprises:
a bandwidth included by a sub-channel, defined in an IEEE 802.11a communication protocol or an IEEE 802.11g communication protocol, allocated by a wireless access point for the target Internet of Things device.

6. The method according to claim 1, wherein the determining a target Internet of Things device comprises:
determining an Internet of Things device currently accessing a wireless access point; and
determining the Internet of Things device as the target Internet of Things device.

7. The method according to claim 1, wherein the statistics on communication data of the target Internet of Things device generated within a preset time period comprises:
the statistics on the communication data generated between the target Internet of Things device and a wireless access point within the preset time period.

8. A terminal, comprising: a processor, a communication interface, a memory, and a communication bus, wherein the processor, the communication interface, and the memory complete communication with each other by using the communication bus, the memory is configured to store a computer program, and the processor is configured to execute the computer program stored in the memory, to implement a wireless bandwidth adjustment method, comprising:
determining a target Internet of Things device and a bandwidth currently used by the target Internet of Things device;
collecting statistics on communication data of the target Internet of Things device generated within a preset time period;
determining a wireless bandwidth adjustment strategy based on the statistics on the communication data; and
adjusting the bandwidth based on the wireless bandwidth adjustment strategy;
wherein the determining a wireless bandwidth adjustment strategy based on the statistics on the communication data comprises:
determining a first transmission time corresponding to the communication data, wherein the first transmission time comprises a time consumed by the target Internet of Things device to transmit the communication data to a wireless access point;
obtaining a second transmission time, in the target Internet of Things device, for the target Internet of Things device to transmit a preset amount of communication data, the second transmission time being used to indicate a time limit for the target Internet of Things device to transmit the preset amount of communication data to the wireless access point;
comparing the first transmission time with the second transmission time; and
determining the wireless bandwidth adjustment strategy based on a comparison result;
wherein the determining the wireless bandwidth adjustment strategy based on a comparison result comprises:
if the first transmission time is greater than the second transmission time, determining that the wireless bandwidth adjustment strategy is a wireless bandwidth extending strategy,
wherein the adjusting the bandwidth based on the wireless bandwidth adjustment strategy comprises:
extending the bandwidth based on the wireless bandwidth extending strategy;
wherein the determining the wireless bandwidth adjustment strategy based on a comparison result comprises:
if the first transmission time is less than the second transmission time, determining that the wireless bandwidth adjustment strategy is a wireless bandwidth narrowing strategy,
wherein the adjusting the bandwidth based on the wireless bandwidth adjustment strategy comprises:
narrowing the bandwidth based on the wireless bandwidth narrowing strategy.

9. The terminal according to claim 8, wherein the wireless bandwidth extending strategy is as follows:

$$B=B0+F(T0\&B0);$$

$$F(T0\&B0)=((T0-T)/T)*B0,$$

wherein B0 denotes the bandwidth currently used by the target Internet of Things device; T0 denotes the first transmission time; T denotes the second transmission time.

10. The terminal according to claim 8, wherein the wireless bandwidth narrowing strategy is as follows:

$$B=B0-F(T0\&B0);$$

$$F(T0\&B0)=((T-T0)/T)*B0,$$

wherein B0 denotes the bandwidth currently used by the target Internet of Things device; T0 denotes the first transmission time; T denotes the second transmission time.

11. The terminal according to claim 8, wherein the bandwidth comprises:
a bandwidth included by a sub-channel, defined in an IEEE 802.11ax communication protocol, allocated by a wireless access point for the target Internet of Things device.

12. The terminal according to claim 8, wherein the determining a target Internet of Things device comprises:
determining an Internet of Things device currently accessing a wireless access point; and
determining the Internet of Things device as the target Internet of Things device.

13. The terminal according to claim 8, wherein the statistics on communication data of the target Internet of Things device generated within a preset time period comprises:
the statistics on the communication data generated between the target Internet of Things device and a wireless access point within the preset time period.

14. A non-transitory storage medium storing a computer program, wherein when the computer program is executed by a processor, the wireless bandwidth adjustment method according to claim 1 is implemented.

* * * * *